US006628339B1

United States Patent
Ferland et al.

(10) Patent No.: US 6,628,339 B1
(45) Date of Patent: Sep. 30, 2003

(54) IMAGE SENSOR MOUNT FOR A DIGITAL CAMERA

(75) Inventors: Albert Ferland, Penfield, NY (US); Stephen R. Cosgrove, Pittsford, NY (US); William F. Giroux, West Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/332,645

(22) Filed: Jun. 14, 1999

(51) Int. Cl.[7] ............... H04N 5/225; H01L 31/0203
(52) U.S. Cl. ............... 348/374; 348/373; 257/433
(58) Field of Search ............... 348/335, 340, 348/373, 374, 294, 376; 257/431–434

(56) References Cited

U.S. PATENT DOCUMENTS

| | | | | |
|---|---|---|---|---|
| 4,803,557 A | * | 2/1989 | Bridges | 358/229 |
| 5,221,964 A | * | 6/1993 | Chamberlain | 358/229 |
| 5,483,284 A | | 1/1996 | Ishiguro | |
| 5,596,229 A | * | 1/1997 | Simon | 257/727 |
| 5,781,807 A | * | 7/1998 | Glassgold et al. | 396/371 |
| 5,861,654 A | * | 1/1999 | Johnson | 257/433 |
| 5,946,404 A | * | 8/1999 | Bakshi et al. | 348/374 |
| 6,351,288 B1 | * | 2/2002 | Johnson et al. | 348/373 |

FOREIGN PATENT DOCUMENTS

JP          61-245773        11/1961

* cited by examiner

Primary Examiner—Wendy R. Garber
Assistant Examiner—Catherine Toppin
(74) Attorney, Agent, or Firm—Pamela R. Crocker

(57) ABSTRACT

In a digital camera having an image sensor and a lens defining an optical axis for focusing an image upon a focal plane, an image sensor mount includes the digital camera having a housing for mounting the lens and defining a first opening through which an image can be focused by the lens and transmitted along the optical axis, and an image sensor assembly including the image sensor attached to an image sensor mounting plate. The image sensor mount further includes a camera mounting plate having first and second surfaces, the first surface being fixedly attached to the camera housing and defining a second opening through the first and second surfaces which is aligned with the first opening, the camera mounting plate including at least three spaced-apart alignment elements on the second surface, the alignment elements being located at a predetermined position relative to the lens; and an image sensor mounting plate for attaching the image sensor assembly to the camera mounting plate so that the image sensor mounting plate engages the alignment elements to center the image sensor with respect to the optical axis at the focal plane.

7 Claims, 4 Drawing Sheets

IMAGE SENSOR MOUNT FOR A DIGITAL CAMERA

CROSS-REFERENCE TO RELATED APPLICATIONS

Reference is made to commonly-assigned U.S. patent application Ser. No. 08/994,003, filed Dec. 18, 1997, entitled "Focal Plane Mounting For An Image Sensor," the disclosure of which is incorporated herein by reference.

FIELD OF THE INVENTION

This invention relates generally to the field of digital cameras, and in particular, to a mount for aligning an image sensor to an optical axis of the digital camera.

BACKGROUND OF THE INVENTION

High resolution digital cameras have been developed for professional photographers, whose business depends on taking high quality pictures. These cameras often use existing 35 mm or medium-format film camera bodies and lenses, together with a customized electronic imaging back that replaces the removable film back ordinarily supplied with the camera. An example is the Kodak DCS 460™ digital camera, which is based upon the Nikon N90s single lens reflex (SLR) camera body. This system, which is compatible with all Nikon lenses and accessories, allows photographers to easily operate the digital camera, and to use their existing equipment with the camera. However, the photosensitive area of the image sensor is often smaller than the film area, and therefore, smaller than the image plane. As a result, the relative magnification of the lens is larger than for 35 mm film.

A problem with this type of camera is the alignment of the image sensor to the optical axis of the camera body. For a non-SLR camera, where the image sensor may be an integral part of an optical assembly, the alignment technique in Japanese Patent Application 61-245773 can be used. Two positioning pins are provided to the rear end of a lens barrel, and are pressed into contact with a ceramic package containing the image sensor in order to optically position the image sensor at an image plane of a lens assembly. However, in an SLR camera system, the image sensor cannot physically locate to the lens assembly because the lens, which is removable, is separated from the image plane by a movable mirror used for through-the-lens viewing.

Consequently, in a camera back system using a film body, the image sensor needs to be referenced to the film plane. For example, as shown in U.S. Pat. No. 5,483,284, an image sensor package possesses four positioning pins at four corners thereof that touch a guide rail plane of an aperture in the camera body. With this arrangement, the image sensor package is precisely located at the focal plane of the lens assembly, i.e., in the z-direction. However, it is difficult to prevent x-y misalignment, which in turn prevents accurate centering of the image sensor package relative to the optical axis of the lens assembly.

An imager mounting plate can also be used to support the image sensor against the camera guide rails at the focal plane of the lens assembly. The imager mounting plate can then be secured to the camera guide rails using a pin and hole configuration to provide x-y alignment. However, the camera guide rails are typically made of either machine steel or molded plastic. Providing alignment holes in machine steel rails would result in increased manufacturing costs. Plastic molded rails, although less expensive to manufacture, do not provide sufficient accuracy of alignment of the image sensor at the focal plane of the lens assembly, and do not allow for interchangeability of the image sensor for servicing. Further, in a camera back system using a film body, warping or deflections in the camera guide rails or in the imager mounting plate can often cause distortions in the digital images.

SUMMARY OF THE INVENTION

Accordingly, it is an object of the present invention to provide an image sensor mount for a digital camera for accurate alignment of the image sensor at the focal plane of the lens assembly.

It is another object of the present invention to provide an image sensor mount for a digital camera which enables ease of replacement and serviceability of the image sensor without using camera guide rails.

It is yet another object of the present invention to provide an image sensor mount for a digital camera which substantially removes any distortions in the digital images.

It is a further object of the present invention to provide an image sensor mount for a digital camera which eliminates the need for mounting holes in the camera housing.

These objects are achieved in a digital camera having an image sensor and a lens defining an optical axis for focusing an image upon a focal plane, an image sensor mount comprising:

(a) the digital camera having a housing for mounting the lens and defining a first opening through which an image can be focused by the lens and transmitted along the optical axis;

(b) an image sensor assembly including the image sensor attached to an image sensor mounting plate;

(c) a camera mounting plate having first and second surfaces, the first surface being fixedly attached to the camera housing and defining a second opening through the first and second surfaces which is aligned with the first opening when the camera mounting plate is mounted to the camera housing, the camera mounting plate including at least three spaced-apart alignment elements on the second surface, the alignment elements being located at a predetermined position relative to the lens; and (d) the image sensor mounting plate being attached to the camera mounting plate so that the image sensor mounting plate engages the alignment elements to center the image sensor with respect to the optical axis at the focal plane.

ADVANTAGES

It is an advantage of the present invention to provide an image sensor mount for a digital camera which enables interchangeability of the image sensor for servicing, while maintaining proper focus alignment accuracy.

It is another advantage of the present invention to provide an image sensor mount for a digital camera which does not introduce any distortions in the digital images.

It is yet another advantage of the present invention to provide an image sensor mount for a digital camera which does not require the use of camera guide rails or of mounting holes in the camera housing, thereby reducing manufacturing cost and complexity.

DETAILED DESCRIPTION OF THE INVENTION

Because imaging devices employing electronic sensors are well known, as are single lens reflex cameras and related components, the present description will be directed in particular to elements forming part of, or cooperating more directly with, apparatus in accordance with the present invention. Elements not specifically shown or described herein may be selected from those known in the art.

Figure 1:
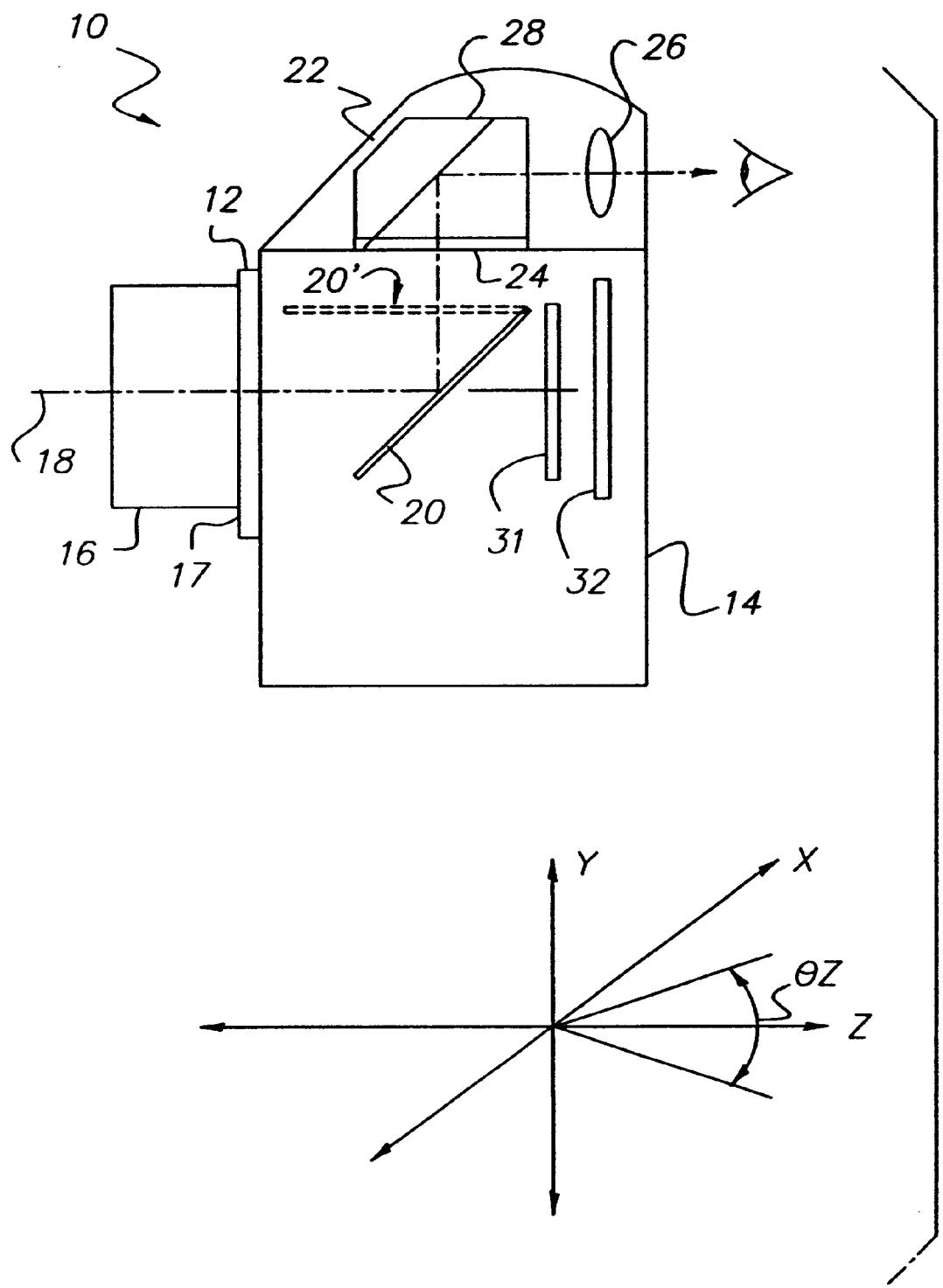
FIG. 1 is a schematic of a digital camera in accordance with the present invention, showing a back enclosure attached to a camera housing.
Figure 2:
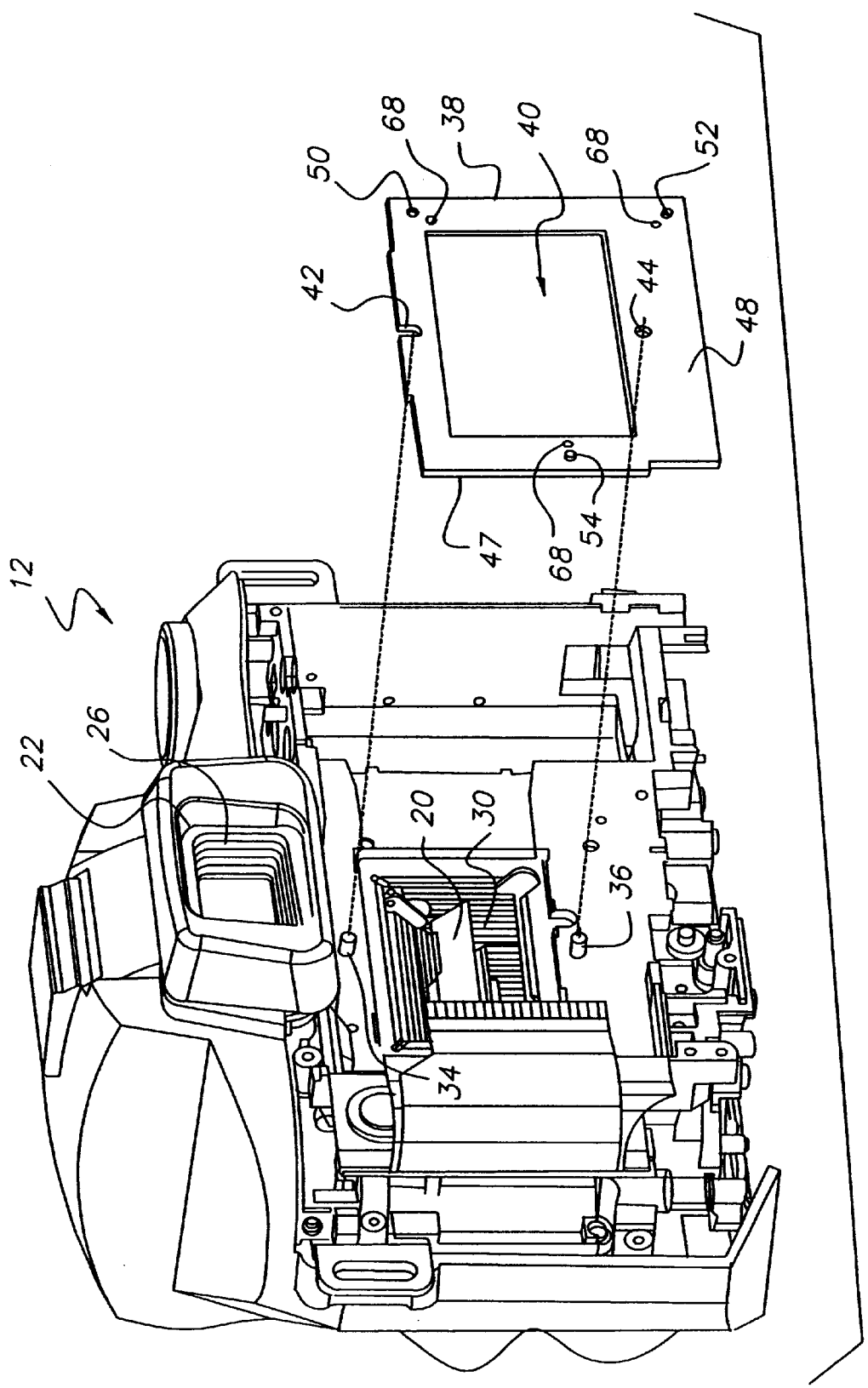
FIG. 2 is a rear view of the digital camera shown in FIG. 1 with the back enclosure removed and showing details of the alignment of a camera mounting plate to the digital camera in accordance with the present invention.

Beginning with FIG. 1, a digital camera 10 is shown mainly in schematic form to include a housing 12 and a back enclosure 14. Although the digital camera 10 is a fully integrated unit in the sense that the back enclosure 14 is not intended to be removable by the photographer, the housing 12 is a conventional 35 mm single lens reflex (SLR) film camera body, such as a Nikon N90s SLR camera body. FIG. 2 shows a rear view of the housing 12 as would be seen during the assembly operation. Referring to FIGS. 1 and 2 together as appropriate, the housing 12 includes a lens 16, typically interchangeable, for directing image light along an optical axis 18 towards a pivotable mirror 20, and a lens mount 17. When the pivotable mirror 20 is in its down position, as shown in FIG. 1, the image light is directed upward toward an optical viewfinder 22. A viewfinder image, which is formed on a focusing screen 24, is viewed through an eyepiece 26 and a prism 28. When the pivotable mirror 20 is raised to the position 20', the image light is directed through an opening 30 (shown in FIG. 2) which cooperates with a focal plane shutter 31, and forms an image on a focal plane 32.

In accordance with the present invention and as shown in FIG. 2, a first camera pin 34 is located above the focal plane shutter 31, and a second camera pin 36 is located below the focal plane shutter 31. A camera mounting plate 38 is positioned parallel to the lens mount 17, and is fixedly attached to the housing 12 at the focal plane 32 by, preferably, an adhesive. Other attaching arrangements can be used as well. Preferably, the camera mounting plate 38 is made of stainless steel.

The camera mounting plate 38 will now be described in more detail with reference to FIG. 2. It will be appreciated by those skilled in the art that the camera mounting plate 38 replaces the conventional film rails used in a film camera to support a film at the focal plane. As shown in FIG. 2, the camera mounting plate 38 defines an opening 40 which is aligned with the focal plane shutter 31 of the camera housing 12 at the focal plane 32. An alignment slot 42 and an alignment hole 44 formed on the camera mounting plate 38 correspond to the first and second camera pins 34 and 36, respectively, for fixedly attaching a first surface 47 of the camera mounting plate 38 to the camera housing 12. The alignment slot 40 and alignment hole 42 provide for alignment of an image sensor 46 (shown in FIG. 3) to the camera mounting plate 38 in the x, y, and theta z directions. The x, y, z, and theta z directions are shown in FIG. 1. Theta z shows a range of angles relative to the z-axis. Similarly, there are theta x and theta y directions which are not shown for clarity of illustration.

The camera mounting plate 38 is then adhesively bonded to the camera housing 12 to provide alignment of the image sensor 46 in the z, theta x, and theta y directions. At least three spaced-apart alignment elements 50, 52, and 54 on a second surface 48 of the camera mounting plate 38 are located a predetermined position relative to the lens mount 17, and thus, to the lens 16. Preferably, the alignment elements 50, 52, and 54 are protrusions which extend outwardly a minimum of approximately 0.38 mm from the second surface 48 of the camera mounting plate 38. The alignment elements 50, 52, and 54 are preferably located ±0.038 mm relative to each other to provide alignment of the image sensor 46 in the z, theta x, and theta y directions to control the depth of focus of the camera 10. Alternatively, the alignment elements 50, 52, and 54 could be positioned on the image sensor mounting plate 60 rather than on the camera mounting plate 38. Preferably, the alignment elements 50, 52, and 54 are semi-circular in shape. However, the alignment elements 50, 52, and 54 could take on various shapes to facilitate alignment of the image sensor 46.

Figure 3:
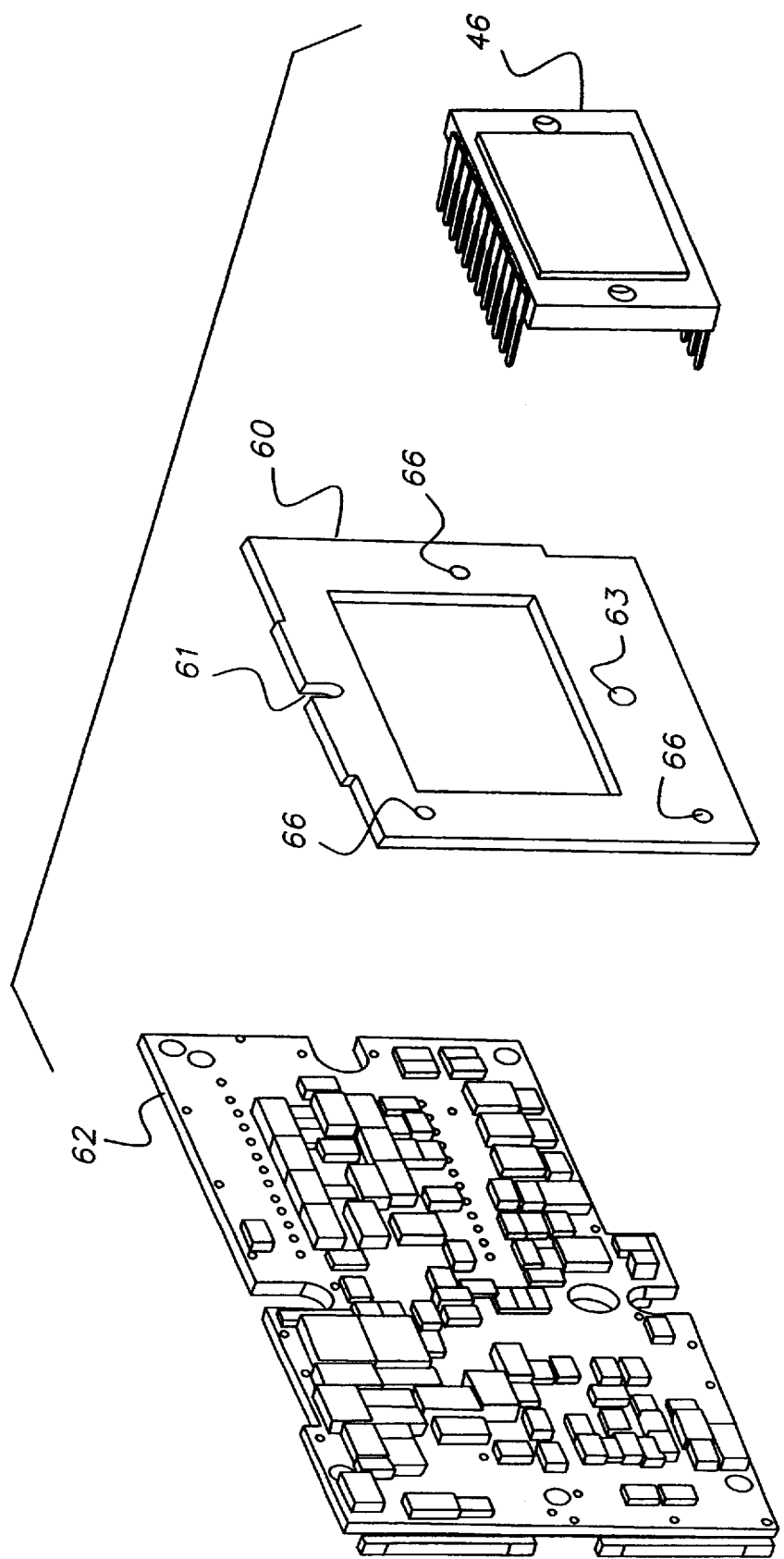
FIG. 3 shows an image sensor mounting plate, an image sensor, and a circuit board in accordance with the present invention for use with the digital camera shown in FIGS. 1 and 2.
Figure 4:
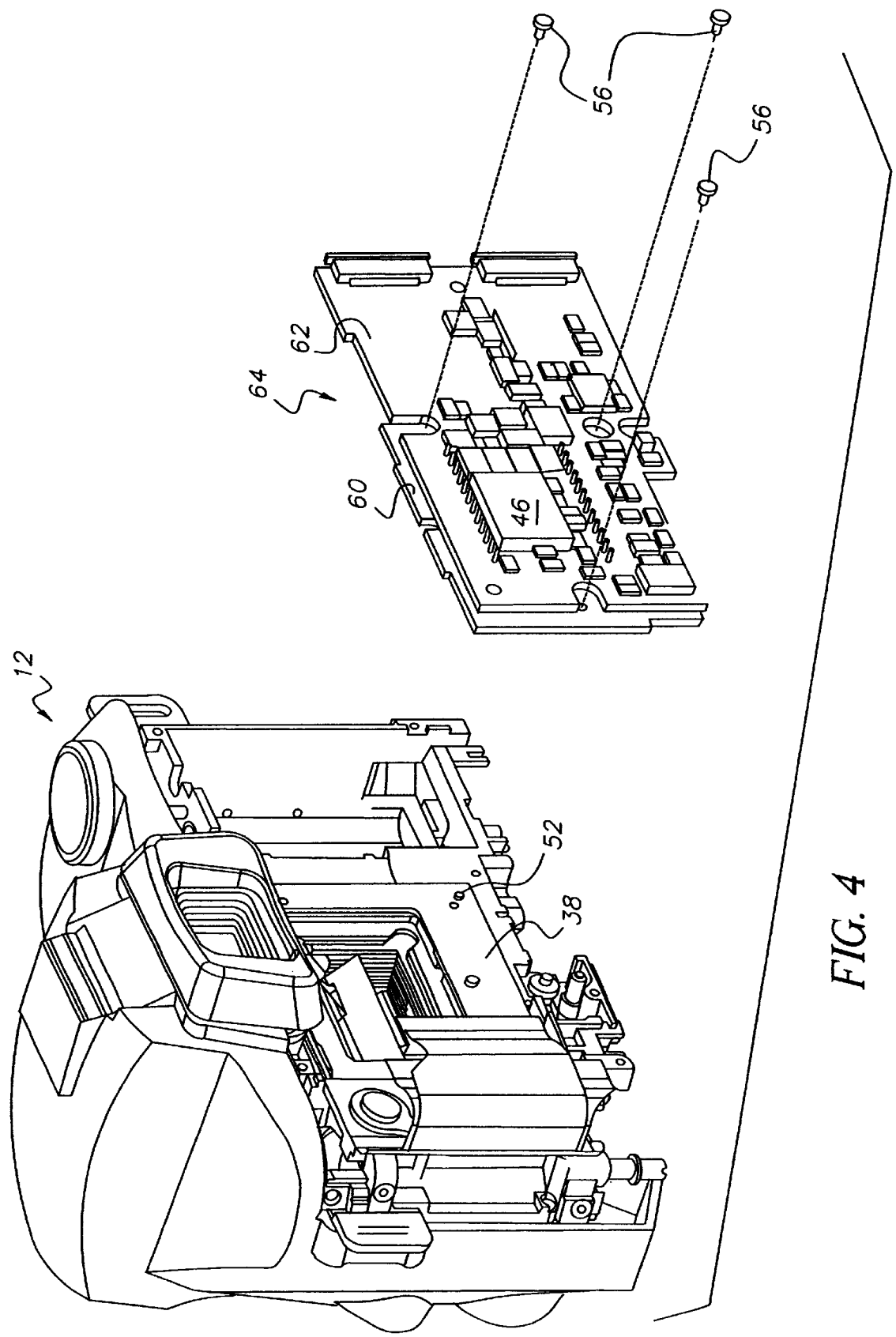
FIG. 4 shows an imager assembly including the components shown in FIG. 3 and showing details of the alignment of the image sensor mounting plate to the camera mounting plate of FIG. 2.

Referring now to FIG. 3, an image sensor mounting plate 60 supports the image sensor 46 in a central region thereof. In accordance with the present invention, the image sensor 46 is optically aligned and adhesively bonded to the image sensor mounting plate 60 in a well-known manner. The image sensor 46 and image sensor mounting plate 60 are then soldered to a circuit board 62 containing conventional circuitry for operating the image sensor 46 and for providing camera functions. This resulting imager assembly 64 (i.e., the image sensor mounting plate 60, the image sensor 46, and the circuit board 62), which is shown in FIG. 4, is then mounted to the camera mounting plate 38 so that the image sensor mounting plate 60 engages the protrusions 50, 52, and 54 on the camera mounting plate 38. An alignment slot 61 and an alignment hole 63 formed in the image sensor mounting plate 60 correspond to the alignment slot 42 and the alignment hole 44, respectively, on the camera mounting plate 38, and to the first and second camera pins 34 and 36, respectively, on the camera housing 12. This arrangement attaches the imager assembly 64 to the camera mounting plate 38. The alignment slot 61 and alignment hole 63 provide for alignment of the imager assembly 64, and thus, the image sensor 46 to the camera mounting plate 38 in the x, y, and theta z directions. Further, by mounting the imager assembly 64 to the camera mounting plate 38 with reference to the protrusions 50, 52, and 54, the imager assembly 64, and thus, the image sensor mounting plate 60 are aligned in the z, theta x, and theta y directions. In this manner, the image sensor 46 is accurately centered with respect to the optical axis 18 of the lens 16 at the focal plane 32.

The image sensor mounting plate 60 is secured to the camera mounting plate 38 by at least three fasteners (shown in FIG. 4), which preferably are screws 56. These screws 56 pass through at least three corresponding tapped fastening holes 66 (shown in FIG. 3) on the image sensor mounting plate 60. The screws 56 are secured in at least three corresponding threaded fastening holes 68 (shown in FIG. 2) on the camera mounting plate 38. In accordance with the present invention and as can be seen in FIG. 2, the at least three threaded fastening holes 68 on the camera mounting plate 38 are each positioned substantially close to one of the three protrusions 50, 52, and 54. This structure minimizes any moment on the camera mounting plate 38 and thereby substantially eliminates any deflection of the camera mounting plate 38 when the imager assembly 64 is attached to the camera mounting plate 38. Preferably, three screws 56 are used, and the threaded fastening holes 68 on the camera mounting plate 38 are each positioned within a maximum range of approximately 3.25 mm of a protrusion.

It will be appreciated by those skilled in the art that the present invention including the three protrusions 50, 52, and 54 on the camera mounting plate 38 provide for ease of serviceability and replacement of the imager assembly 64 while maintaining substantially no change in the z, theta x, and theta y directions. Thus, the focus and sharpness of the images captured by the digital camera 10 can be maintained. Further, since the protrusions 50, 52, and 54 are located a predetermined position relative to the lens 16, the image sensor 46 is accurately centered with respect to the optical axis 18 of the lens 16 at the focal plane 32. Accordingly, alignment of the image sensor 46 is independent of the actual image sensor that is used. In addition, the present invention substantially eliminates any distortions in the images captured by the digital camera 10 that may be caused by warping or deflections in the camera mounting plate 38 or the image sensor mounting plate 60.

The invention has been described in detail with particular reference to a certain preferred embodiment thereof, but it will be understood that variations and modifications can be effected within the spirit and scope of the invention.

PARTS LIST 10 digital camera
12 housing
14 back enclosure
16 lens
17 lens mount
18 optical axis
20 pivotable mirror
22 optical viewfinder
24 focusing screen
26 eyepiece
28 prism
30 opening
31 focal plane shutter
32 focal plane
34 first camera pin
36 second camera pin
38 camera mounting plate
40 opening
42 alignment slot
44 alignment hole
46 image sensor
47 first surface
48 second surface
50 alignment element
52 alignment element
54 alignment element
56 fastener
60 image sensor mounting plate
61 alignment slot
62 circuit board
63 alignment slot
64 imager assembly
66 tapped fastening hole
68 threaded fastening hole

What is claimed is:

1. In a digital camera having an image sensor and a lens defining an optical axis for focusing an image upon a focal plane, an image sensor mount comprising:

(a) the digital camera having a housing for mounting the lens and defining a first opening through which an image can be focused by the lens and transmitted along the optical axis;

(b) an image sensor assembly including the image sensor attached to an image sensor mounting plate;

(c) a camera mounting plate having first and second surfaces, the first surface being fixedly attached to the camera housing and defining a second opening through the first and second surfaces which is aligned with the first opening when the camera mounting plate is mounted to the camera housing, the camera mounting plate including at least three spaced-apart alignment elements on the second surface, the alignment elements being protrusions located at a predetermined position relative to the lens; and (d) the image sensor mounting plate being attached to the camera mounting plate so that the image sensor mounting plate engages the alignment elements to center the image sensor with respect to the optical axis at the focal plane.

2. The image sensor mount according to claim 1 wherein the camera mounting plate is fixedly attached to the camera housing by an adhesive.

3. In a digital camera having an image sensor and a lens defining an optical axis for focusing an image upon a focal plane, an image sensor mount comprising:

(a) the digital camera having a housing for mounting the lens and defining a first opening through which an image can be focused by the lens and transmitted along the optical axis, the housing including first and second camera pins;

(b) an image sensor assembly including the image sensor attached to an image sensor mounting plate;

(c) a camera mounting plate having first and second surfaces, the first surface being fixedly attached to the camera housing and defining a second opening through the first and second surfaces which is aligned with the first opening when the camera mounting plate is mounted to the camera housing, the camera mounting plate including at least three spaced-apart alignment elements on the second surface, the alignment elements being located at a predetermined position relative to the lens, and further including a slot for alignment with the first camera pin and a defining hole for alignment with the second camera pin; and (d) the image sensor mounting plate being attached to the camera mounting plate so that the image sensor mounting plate engages the alignment elements to center the image sensor with respect to the optical axis at the focal plane.

4. The image sensor mount according to claim 3, wherein the camera mounting plate defines at least three fastening holes, and the image sensor mounting plate defines at least three corresponding fastening holes, and further including at least three screws passing through the corresponding holes in the image sensor mounting plate and the camera mounting plate, respectively, for securing the image sensor to the camera housing.

5. The image sensor mount according to claim 4, wherein the at least three fastening holes on the camera mounting plate are each positioned within a maximum range of approximately 3.25 mm of an alignment element, to substantially minimize deflection of the camera mounting plate when the image sensor mounting plate is attached to the camera mounting plate.

6. The image sensor mount according to claim 3, wherein the alignment elements are protrusions.

7. The image sensor mount according to claim 3, wherein the camera mounting plate is fixedly attached to the camera housing by an adhesive.

* * * * *